INVENTORS
MARIO RAGAZZINI
DONATO CARCANO

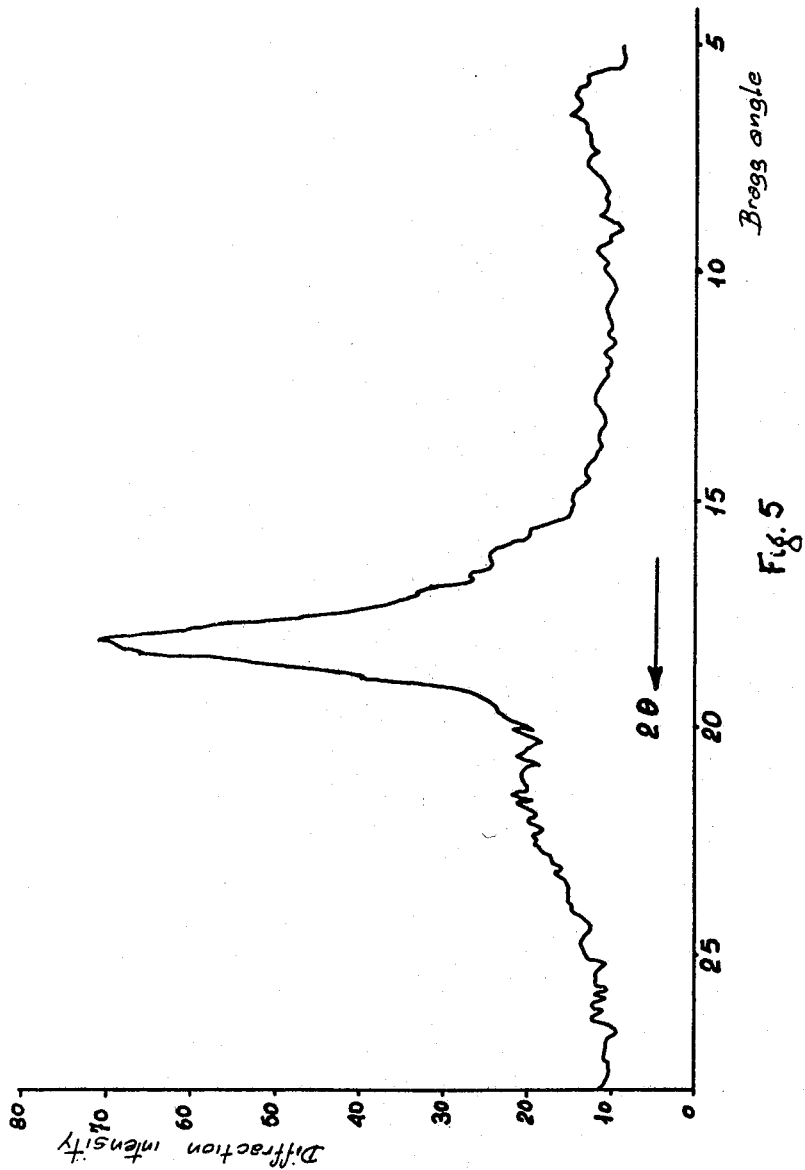

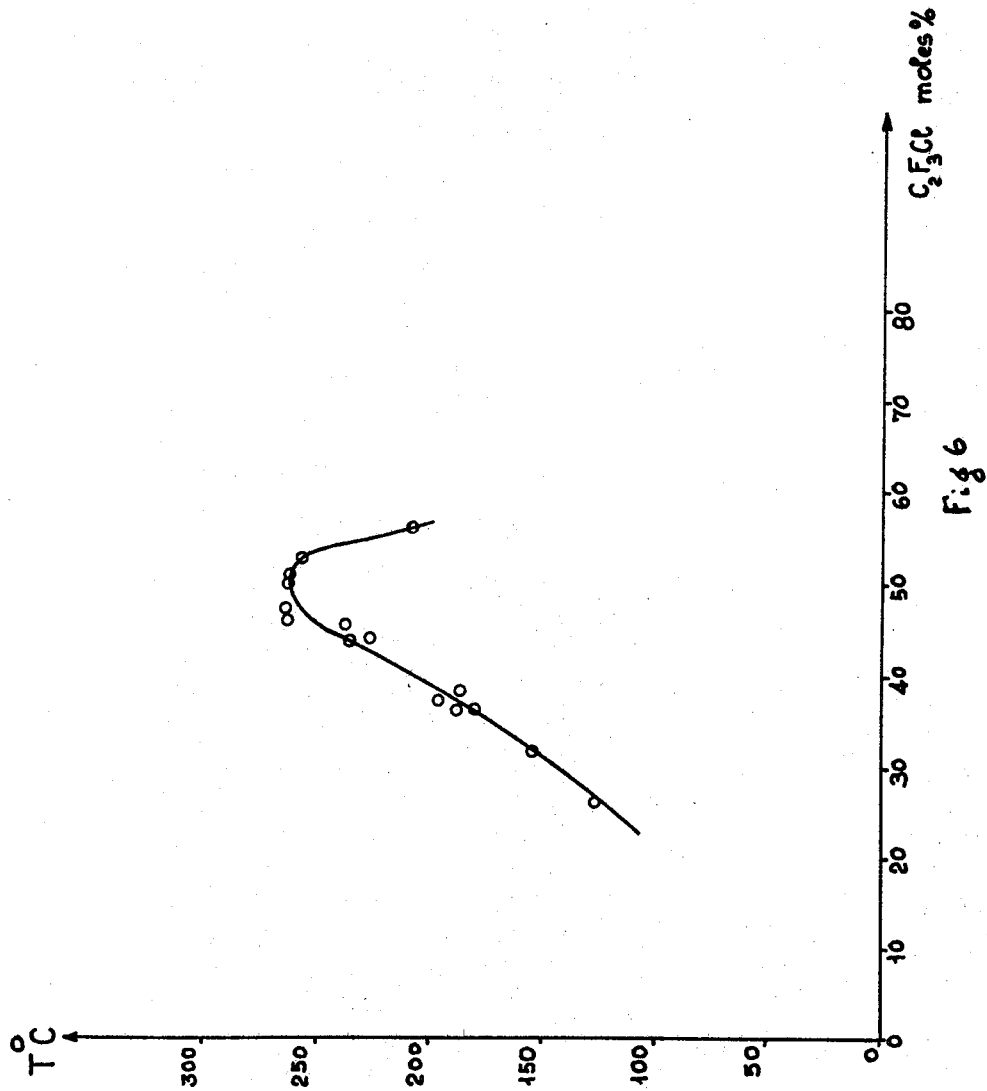

United States Patent Office 3,501,446
Patented Mar. 17, 1970

3,501,446
ETHYLENE-MONOCHLOROTRIFLUOROETHYLENE CRYSTALLINE COPOLYMERS
Mario Ragazzini and Donato Carcano, Milan, Italy, assignors to Montecatini Edison S.p.A., Milan, Italy, a corporation of Italy
Continuation of application Ser. No. 568,227, July 27, 1966, which is a continuation-in-part of application Ser. No. 178,576, Mar. 9, 1962. This application Mar. 4, 1968, Ser. No. 711,164
Claims priority, application Italy, Mar. 10, 1961, 4,527/61, Patent 648,753
Int. Cl. C08f *15/02*
U.S. Cl. 260—87.5      2 Claims

ABSTRACT OF THE DISCLOSURE

The invention consists in ethylene-monochlorotrifluoroethylene copolymers which are crystalline in structure, have a melting point remarkably higher than the melting points of polyethylene and polymonochlorotrifluoroethylene, and a molar ratio of ethylene to monochlorotrifluoroethylene between 1 and 2, the melting point being a function of the monochlorotrifluoroethylene content of the copolymer, the maximum corresponding to a molar ratio of monochlorotrifluoroethylene to ethylene equal to 1. The copolymers are produced by contacting the monomers with a catalyst selected from the group consisting of boron alkyls, boron hydrides, alkyl boron hydrides and their complexes in the presence of a substance yielding oxygen.

---

This application is a continuation-in-part of our copending application Ser. No. 178,576, filed Mar. 9, 1962 now Patent No. 3,371,076 and is a continuation of our copending application Ser. No. 568,227, now abandoned filed July 27, 1966.

The present invention relates to ethylene-monochlorotrifluoroethylene copolymers which are crystalline in structure, and more particularly to ethylene monochlorotrifluoroethylene crystalline copolymers with a melting point remarkably higher than the melting points of polyethylene and polymonochlorotrifluoroethylene.

The importance that catalysts based on boron alkyl have been assuming in recent years in the polymerization and copolymerization of vinyl monomers and vinylidene monomers is well known. An earlier patent application of applicants, Ser. No. 148,055, filed Oct. 27, 1961, related to a process of polymerization and copolymerization of vinylic and vinylidenic monomers using as catalysts the complexes that boron alkyls, boron hydrides and alkyl boron hydrides form with substances having electron-donator character of the type of derivatives of nitrogen, phosphorous, arsenic, antimony, bismuth, oxygen, sulfur, and selenium.

Moreover, there are also known processes of polymerization of ethylene and alpha-olefines wherein compounds of boron mixed with salts of metals selected from those of the 4th, 5th, 6th and 8th group of Mandeleeff's periodical table are employed as catalysts (e.g. U.S. Patent No. 2,840,551).

In co-pending application Ser. No. 178,576 now Patent No. 3,371,076 referred to above, the disclosure is made that it has been found surprisingly that boron alkyls, boron hydrides, alkyl boron hydrides and their complexes above described are particularly active in catalyzing the copolymerization of ethylene and alpha-olefines with fluorinated unsaturated monomers.

The resulting copolymers are white solids with high melting points, highly stable under chemical and physical attack, and with good mechanical characteristics. On analysis, the infrared spectra of said products appeared to be different from both that of the fluorinated homopolymer and that of polyethylene.

In addition it has now surprisingly been found, and this is the subject of this application, that ethylene-monochlorotrifluoroethylene copolymers (with a molar ratio between ethylene and monochlorotrifluoroethylene between 1 and 2) are crystalline in structure, and have a melting point higher than the melting points of polyethylene and polymonochlorotrifluoroethylene, said melting point being a function of the monochlorotrifluoroethylene content with the maximum corresponding to a molar ratio of monochlorotrifluoroethylene/ethylene equal to 1.

In the case of ethylene-monochlorotrifluoroethylene copolymers with a molar ratio between ethylene and monochlorotrifluoroethylene equal to one, the copolymers made according to the present invention have a nearly perfect alternation of ethylene with monochlorotrifluoroethylene units along the copolymer chains.

Other characteristics of the copolymers of this invention will be evident from the following examples that are also given in order better to illustrate the inventive idea of the present invention.

The spectra relating diagrams of FIGS. 1, 2, 3 and 4 are infrared spectra. (IR spectra)

FIG. 5 is an X-ray spectrum of a copolymer of ethylenemonochlorotrifluoroethylene with a final molar ratio 1:1 (prepared at −80° C.); and FIG. 6 shows the variation of the melting points of ethylene-monochlorotrifluoroethylene copolymers for different moles percent of monochlorotrifluoroethylene in the copolymer.

EXAMPLE 1

In a 500 cc. flask, fitted with a perfectly tight propeller stirrer, immersed in a trichloroethylene bath and Dry Ice at −78° C., 200 cc. of chlorotrifluoroethylene are condensed in nitrogen current. Through a dipping tube there is then introduced the quantity of ethylene necessary for obtaining a molar composition of the liquid phase chlorotrifluoroethylene/ethylene=75/25. Thereupon, by means of a hypodermic syringe there are introduced in this order: 1 cc. ethylic ether, 100 cc. oxygen and 10 cc. of a solution at 10% by volume of triethyl boron in trichlorotrifluoroethane ($CCl_2F$—$CClF_2$). The polymerization is conducted for five hours and 150 gr. of a copolymer containing 24.6% by weight of chlorine, corresponding to a molar ratio chlorotrifluoroethylene/ethylene equal to 1/1, are thus obtained.

Figure 1:
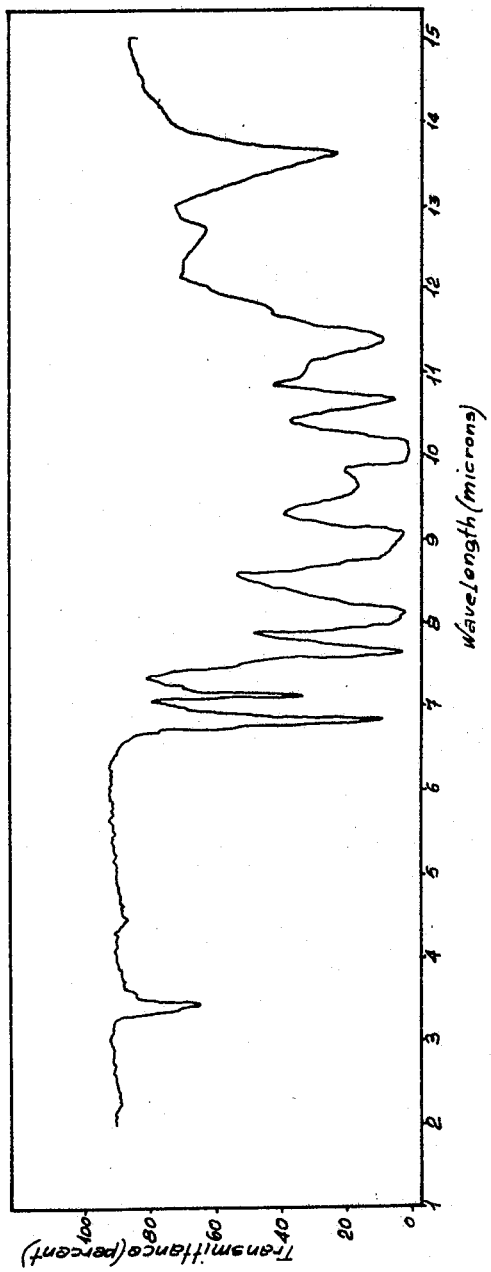
FIG. 1 is a diagram illustrating the spectrum of a copolymer ethylene-monochlorotrifluoroethylene with a final molar ratio 1:1 (in the range of 1–15 microns)
Figure 2:
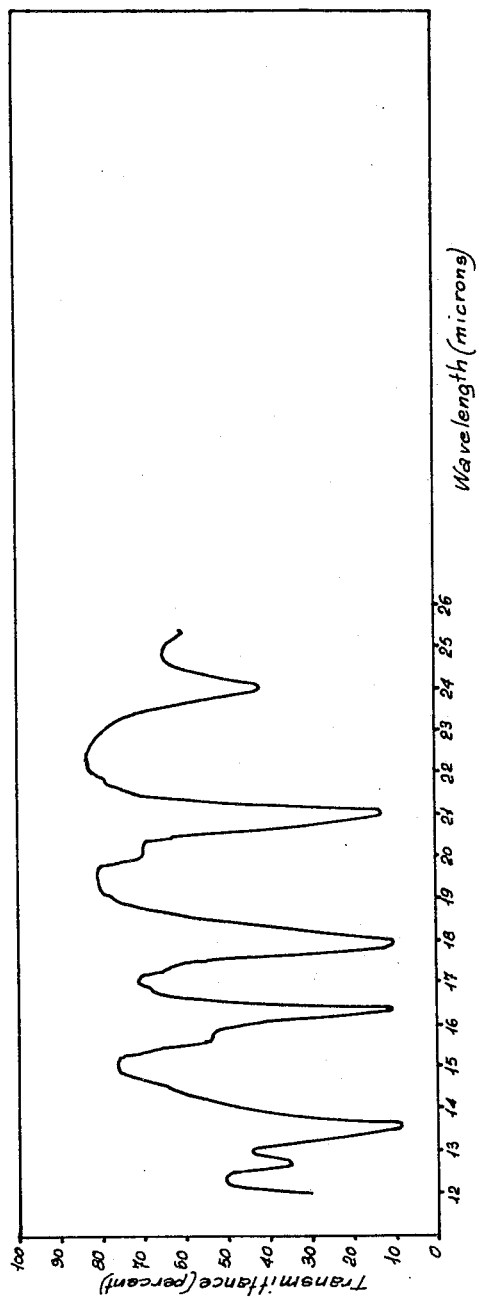
FIG. 2 is a diagram showing the spectrum of a copolymer ethylene-monochlorotrifluoroethylene with a molar ratio 1:1 (in the range 12–25 microns)
Figure 3:
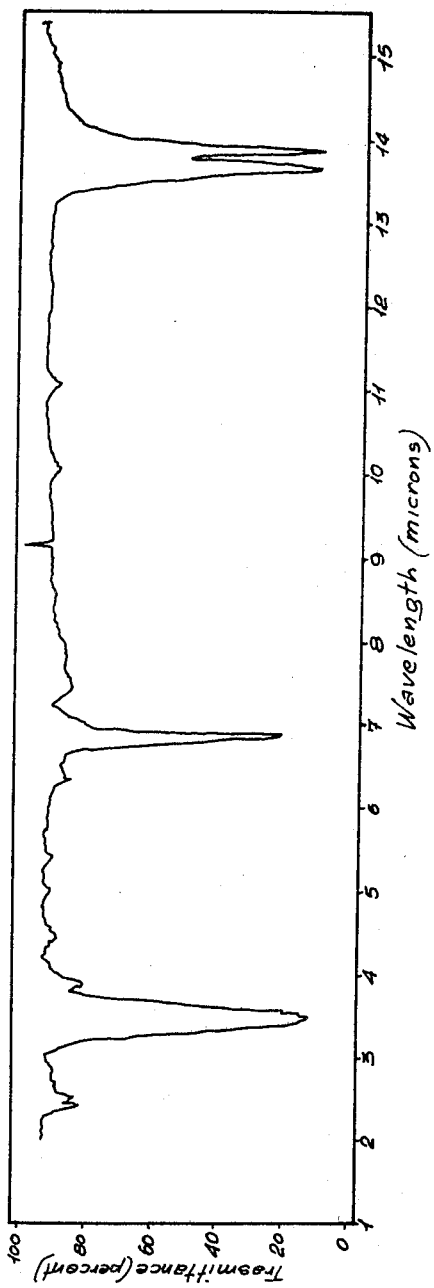
FIG. 3 is a diagram showing the spectrum of polyethylene.
Figure 4:
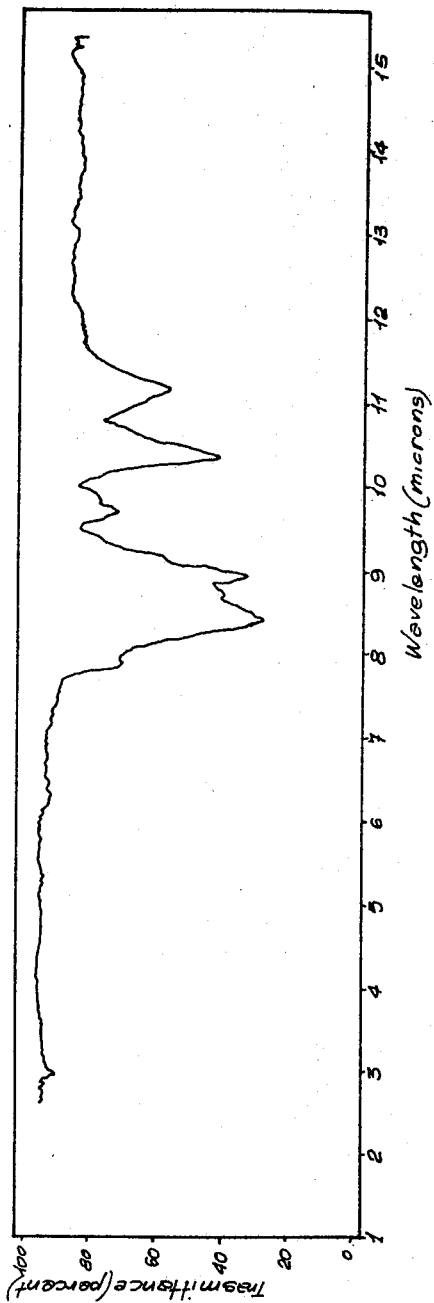
FIG. 4 is a diagram of the spectrum of polymonochlorotrifluoroethylene.

The infrared spectrum (FIGS. 1 and 2) shows that it as an actual copolymer, as can be seen by comparing the absorption bands of the recorded spectrum with those of the polychlorotrifluoroethylene (FIG. 4) and of the linear polyethylene (FIG. 3). The X-ray spectrum (FIG. 5) is characteristic for a crystalline product.

In this copolymer the two comonomers regularly alternate along the chain and such an arrangement gives the product peculiar characteristics, such as, for instance, the melting point, which is 260° C., as may be noticed by observing FIG. 6, wherein are recorded the melting points of this copolymer and of copolymers of different compositions.

According to this invention not merely one copolymer (having a 1/1 molar composition) is obtainable, but rather copolymers having a selective ethylene content of from 49.49 to 65.90 moles percent are obtainable by varying the ethylene content of the starting mixture (consisting of ethylene and molochlorotrifluoroethylene) in the range 3.73 to 93.10 moles percent, while the other conditions of polymerization (pressure, temperature, etc.) are kept constant. In particular, copolymers having an ethylene content varying from 49.49 to 55.94 moles percent are obtainable by varying the ethylene content in the starting mixture from 3.73 to 79.38 moles percent.

It can therefore be said that in the copolymer obtained the molar ratio of ethylene to monochlorotrifluoroethylene is "about 1:1."

From the graph (FIG. 6) it will be observed that the copolymers of a molar composition of 1/1 have a melting point of about 50° C. higher than that of polychlorotrifluoroethylene and of about 120° C. higher than that of the linear polyethylene. The melting point of linear polyethylene is, however, 138.5° C. and the melting point of monochlorotrifluoroethylene polymer is 210° C. (Reference: L. Mandelkern, "Crystallization of Polymers," McGraw-Hill, New York, 1964, page 119). The alternating of the two monomeric units along the polymer chain becomes evident when considering the reactivity ratios of the two monomers, $rC_2H_4 = 0.07$ $rC_2F_3Cl = 0.001$. The value of the product of such reactivity ratios, at a temperature of $-78°$ C., is thus very near zero. From this it follows that although the molar composition of the monomeric mixture may be varied within a rather wide range, there are obtained copolymers of about 1/1 molar composition with the two units regularly alternated.

EXAMPLE 2

Following the same procedures as those of Example 1, a test is carried out in which all the reaction parameters, with the exception of the molar ratio chlorotrifluoroethylene/ethylene which is fixed at 50/50, are the same as those of the above mentioned example. The copolymer thus obtained shows chemical, physical and structural characteristics fully indentical with those of the product described in Example 1.

EXAMPLE 3

In a 500 cc. flask, immersed in a bath of trichloroethylene cooled to $-40°$ C. with Dry Ice and fitted with a perfectly tight propeller stirrer, a co-polymerization test is conducted for 4 hours, following the same procedures as those of Example 1. 180 gr. of a copolymer are obtained that will contain 24.6% by weight of chlorine, corresponding to a molar ratio chlorotrifluoroethylene/ethylene=1/1. The melting point of the product will be about 235° C. and the structural analysis will yield the same results as those obtained for the copolymers prepared at $-78°$ C.

Having thus described our invention, what we claim is:

1. Ethylene - monochlorotrifluoroethylene copolymers having a molar ratio of ethylene to monochlorotrifluoroethylene between 1 and 2 and produced by contacting the monomers with a catalyst selected from the group consisting of boron alkyls, boron hydrides, alkyl boron hydrides and their complexes in the presence of a substance yielding oxygen.

2. Ethylene - monochlorotrifluoroethylene copolymers as claimed in claim 1, having an ethylene content varying from 49.49 to 55.94 moles percent.

References Cited

FOREIGN PATENTS 648,753   11/1962   Italy.

JOSEPH L. SCHOFER, Primary Examiner

J. A. DONAHUE, Assistant Examiner